United States Patent [19]

Pettigrew

[11] Patent Number: 4,776,701

[45] Date of Patent: Oct. 11, 1988

[54] DISPLACEMENT MEASURING APPARATUS AND METHOD

[75] Inventor: Robert M. Pettigrew, Foxton, England

[73] Assignee: Dr. Johannes Heidenhain GmbH, Traunreut, Fed. Rep. of Germany

[21] Appl. No.: 736,275

[22] Filed: May 20, 1985

[30] Foreign Application Priority Data

May 31, 1984 [GB] United Kingdom ............... 8413955

[51] Int. Cl.$^4$ ............................................. G01B 9/02
[52] U.S. Cl. .................................................. 356/356
[58] Field of Search ........................ 356/354, 355, 356

[56] References Cited

U.S. PATENT DOCUMENTS 4,176,276 11/1979 Kaul et al. ................. 356/356 X
4,576,850 3/1986 Martens ....................... 522/1 X

FOREIGN PATENT DOCUMENTS 2316248 10/1974 Fed. Rep. of Germany .
1474049 5/1977 United Kingdom .

OTHER PUBLICATIONS

"The Use of Reflection Diffraction Gratings in Interference Systems for Measuring Linear Shifts, II" from aus Zeitschrift, "Opt. Spectrose. 14, 215 (1963) S. 295-300, pp. 295-297.

Primary Examiner—Davis L. Willis
Assistant Examiner—Matthew W. Koren
Attorney, Agent, or Firm—Willian Brinks Olds Hofer Gilson & Lione Ltd.

[57] ABSTRACT

Displacement measuring apparatus comprises a light source (10), a lens (12), and index grating (14), a reflective scale grating (16), and three photodetectors (18) at positions corresponding to the zero order and positive and negative first order images of the source (10). The index grating (14) has a castellated surface profile with a mark/space ratio (a/b, FIG. 3) and a castellation height (h, FIG. 3) chosen so that the three photodetectors (18) see wavefronts having a phase separation of 120. The electrical signals from the photodetectors (18) are used to sense the magnitude and direction of movement of a reading head carrying the components (10, 12, 14 and 18) with respect to the scale grating (16).

13 Claims, 2 Drawing Sheets

DISPLACEMENT MEASURING APPARATUS AND METHOD

FIELD OF THE INVENTION

This invention relates to a displacement measuring apparatus and method, relying on the use of devices called Moire encoders which can measure longitudinal or angular displacements.

BACKGROUND TO THE INVENTION

The invention commences from the art known in British Patent Specification No. 1474049 (Leitz) and a paper by Rassudova and Gerasimov published in Optical Spectroscopy 14,215 (1963). This art shows three grating interference structures which in practical forms are reduced to two grating structures by making one of the gratings reflective. Moire bands are generated and examination of these bands enables the magnitude and direction of relative movement between the two gratings to be obtained. The present invention aims to provide very high resolution and relaxed alignment tolerances using fine gratings typically having a pitch of 40 $\mu$meters. The Moire bands are examined by photodetectors which for accuracy should see the same scanning field. It is therefore desirable to use focal plane detectors and to use diffraction orders $-1, 0, +1$.

It is therefore necessary to get phase separation between the diffraction orders detected by the detectors. In the specification of Leitz, one grating is tilted relative to the other in order to provide differential spacing between the gratings. The main disadvantage of this system is that the magnitude of the phase separation or offset depends largely on the gap between the two gratings. For fine pitch gratings (eg 8 $\mu$meters) this gap may be of the order of tens of $\mu$meters, and a small change in the separation may lead to an unacceptable change in relative phase. The invention aims to provide an alternative means and method for obtaining phase offset or separation which does not suffer from the disadvantage of Leitz.

SUMMARY OF THE INVENTION

According to one aspect of the invention displacement measuring apparatus for measuring relative displacement between two members comprises an index grating mounted on one member, a reflective scale grating mounted on the other member, a light source for illuminating the index grating and then the scale grating with light so that an image of the scale grating interacts with the index grating to form an interference image, and a plurality of detectors for detecting different diffraction orders of the interference image and deriving corresponding output signals representative of relative movement between the two members, the index grating having characteristics chosen to impart a desired phase separation between the diffraction orders detected in the detectors.

Said characteristics of the index grating may include the surface profile and/or the light absorption coefficient of the material from which the index grating is made. The surface profile of the index grating may be of any chosen shape, but a preferred shape is castellated, with either flat or domed tops to each castellation.

It has been found that the phase separation (between the wavefronts of the different diffraction orders detected by the detectors) depends on the ratio of the width of each castellation to the width of the gap between adjacent castellations, a ratio which is called the mark/space ratio by analogy with a repetitive electrical waveform.

The detectors may detect any different orders, but a preferred arrangement is for there to be three detectors respectively detecting the zero order and the positive and negative first orders.

The phase separation also depends to some extent on the height of each castellation. It has been found by experiment that a height of the order 0.5 microns not only gives optimum phase separation of 120° between the three signals but also maximises signal contrast.

The scale grating ideally has 100% of reflectivity, is preferably made from a robust and durable material and has a rectangular profile groove.

The gratings may be made by using ultra-violet curing polymers, which provide for accurate and reliable replication. Ultra-violet curing polymers are widely used as bases in screen printing. When loaded with inks these materials can be coated onto plastics or metals. Exposure to ultra-violet light results in polymerisation of the material to give a stable compound, bonded to the base.

According to another aspect of the invention a method of measuring relative displacement between two members respectively carrying an index grating and a reflective scale grating, comprises illuminating the index grating and the scale grating with light whereby an image of the scale grating interacts with the index grating to form an interference image, detecting different diffraction orders of the interference image and deriving corresponding output signals representative of relative movement between the two members, the index grating having characteristics chosen to impart a desired phase separation between the diffraction orders detected by the detectors.

As with said one aspect of the invention, the phase separation is preferably 120° between the zero order and the positive and negative first orders, with the index grating having a castellated shape in which each step height is of the order of 0.5 microns and the mark/space ratio chosen to provide the required 120° phase separation.

The invention will now be further described by way of example with reference to the accompanying drawings, in which:

FIG. 1 is an optical diagram of displacement measuring apparatus according to the invention, FIG. 2 is a schematic optical diagram, and FIG. 3 is an enlarged view showing part of the index grating of FIGS. 1 and 2.

DETAILED DESCRIPTION OF THE DRAWINGS

Figure 1:
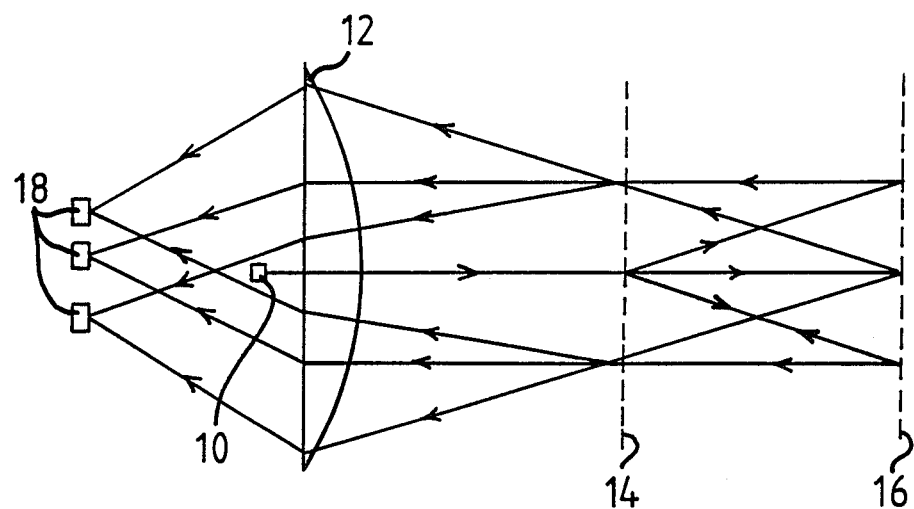
Figure 2:
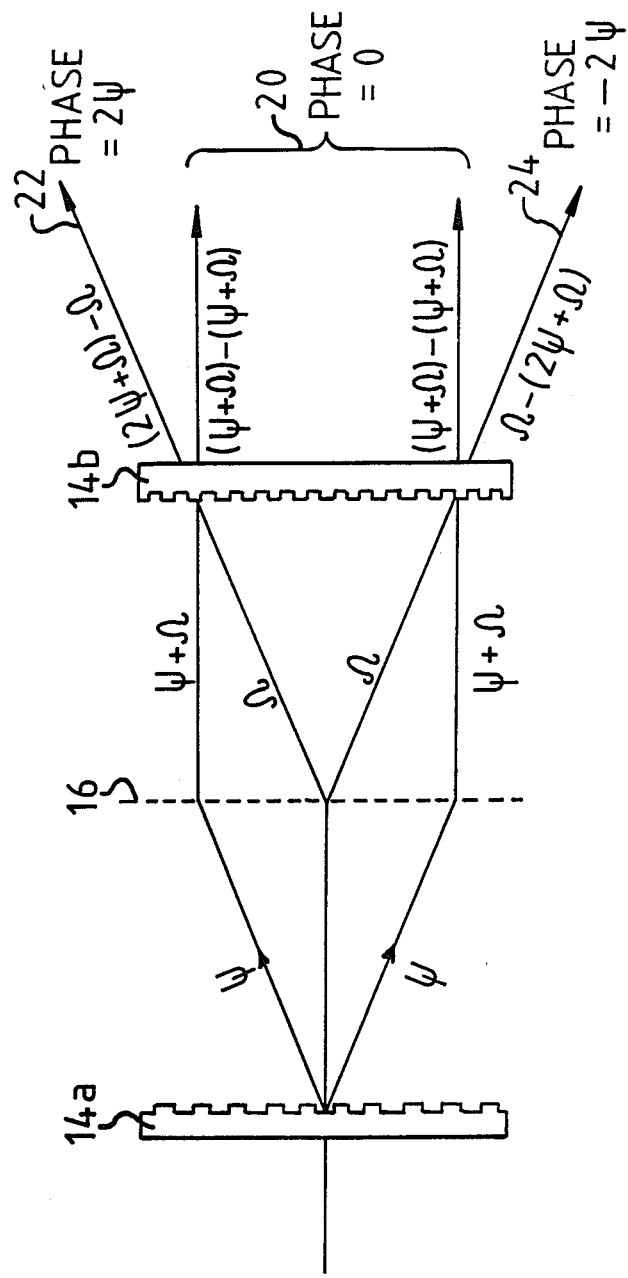

Referring to FIG. 1, the apparatus comprises a light source 10, a lens 12, an index grating 14, a reflective scale grating 16 and three focal plane photodetectors (represented by 18) at positions corresponding to the zero order and positive and negative first order images of the source 10. In a practical embodiment, the components 10, 12 14 and 18 would be mounted on a reading head movable with respect to the reflective scale grating 16. Electrical output signals from the photodetectors 18 provide a measure of the direction and magnitude of the displacement of the reading head relative to the stationary scale grating 16. Linear or angular movement between members can be measured. FIG. 2 is, in effect, an "unfolded" diagram of FIG. 1. In FIG. 2 the scale grating, which is really reflective, is shown as a transmission grating for ease of illustrating the paths taken by the optical wavefronts and their relative phases. Hence, in FIG. 2 the two index gratings 14a and 14b are in actuality constituted by the single index grating 14 shown in FIG. 1.

Referring to the optical system of FIG. 2, the input beam is split by the index grating 14a into a zero order of diffraction and first orders delayed by $\psi$ radians with respect to the zero order. At the scale grating 16, the first order is delayed by $\Omega$ radians. The result is that the zero order wavefront 20 has phase 0, the positive first order wavefront 22 has a phase $2\psi$ and the negative first order wavefront 24 has a phase $-2\psi$. It will be noted that the phase shifts introduced by the scale grating 16 are cancelled when the rays are reconstituted at the final index grating 14b, and thus the resulting phase relationships between the wavefronts 20, 22 and 24 are independent of the parameters of the scale grating 16.

Figure 3:
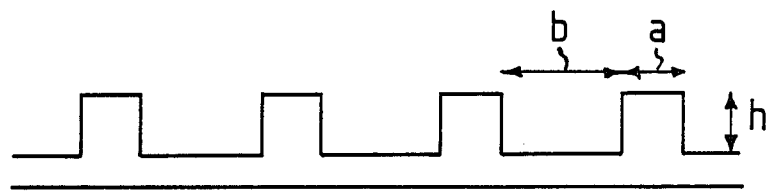

It is desirable to have a phase separation of 120° between the three wavefronts 20, 22 and 24 seen by the three detectors 18, because this maximises the accuracy of the signals produced by the detectors. Tests were carried out using an index grating 14 having a castellated shape (FIG. 3). With the gap between the index grating 14 and scale grating 16 held at 1 mm, the phase separation and depth of modulation of the signals from the detectors was measured for step heights in between 0.27 and 0.572 microns. It was found that a step height of 0.5 microns not only gave the desired 120° phase separation but also gave the highest depth of modulation in the zero order.

The mark/space ratio of the grating 14 shown in FIG. 3 is a:b. If, for example, a:b is 1:3, theory shows that h, the height of each step, should be 0.51 microns to give 120° phase separation.

I claim:

1. Displacement measuring device for measuring relative displacement between at least two members, a device comprising:
    a light source;
    a reflective scale grating mounted on one member;
    an index grating mounted on the other member, the index grating defining at least one of (1) a surface profile; and (2) a light absorbent coefficient such that the index grating produces an interference image in cooperation with the light source and the scale grating, wherein the interference image defines a plurality of diffraction orders; and
    a plurality of photodetectors positioned to detect the zero and the positive and negative first diffraction orders of the interference image.

2. The invention of claim 1 wherein the surface profile of the index grating is castellated and wherein the mark/space ratio of the castellations and the height of each castellation are chosen to give a phase separation of 120° between the zero and the positive and negative first diffraction orders.

3. The invention of claim 2 wherein the mark/space ratio of the castellations deviates from a 1:1 ratio.

4. Displacement measuring device for measuring relative displacement between two members, the device comprising:
    an index grating mounted on one member;
    a reflective scale grating mounted on the other member;
    a light source for illuminating the index grating and then the scale grating with light so that an image of the scale grating interacts with the index grating to form an interference image;
    the index grating having characteristics chosen to impart a desired phase separation between at least selected diffraction order groups derived from selected diffraction orders of the interference image; and
    at least three detectors for detecting the zero order and the positive and negative first order groups from the zero order and positive and negative first diffraction orders of the interference image to produce output signals representative of relative movement between the two members.

5. The invention of claim 4 wherein the characteristics of the index grating include at least one of (1) the surface profile; and (2) the light absorption coefficient of the material from which the index grating is made.

6. The invention of claim 5 wherein the surface profile of the index grating is castellated.

7. The invention of claim 6 wherein the castellation has a flat top.

8. The invention of claim 6 wherein the castellation has a domed top.

9. The invention of claim 6 wherein the mark space ratio of the castellations, and the height of each castellation, are chosen to give a phase separation of 120° between the three signals.

10. The invention of claim 6 wherein the height of each castellation is approximately 0.5 microns.

11. The invention of claim 6 wherein the mark space ratio of the castellations deviates from 1:1 ratio.

12. The invention of claim 4 wherein the gratings are made by using ultra-violet curing polymers, which provide for accurate and reliable replication.

13. A method of measuring relative displacement between two members carrying an index grating and a reflective scale grating respectively, the method comprising the steps of:
    illuminating the index grating and the scale grating with light such that an image of the scale grating interacts with the index grating to form an interference image, wherein at least selective diffraction order groups of the interference image have a desired phase separation, the phase separation determined by chosen characteristics of the index grating; and
    detecting at least the zero order and the positive and negative first order groups derived from the zero and the positive and negative first diffraction orders of the interference image to produce output signals representative of relative movement between the two members.

* * * * *